United States Patent

Hammer et al.

(10) Patent No.: US 6,718,236 B1
(45) Date of Patent: Apr. 6, 2004

(54) METHOD FOR CONDUCTING A MOVING VEHICLE ALONG A TRAJECTORY OF A COORDINATED MANEUVER BASED ON STATE INFORMATION BROADCAST BY OTHER VEHICLES PARTICIPATING IN THE COORDINATED MANEUVER

(75) Inventors: Jonathan Hammer, Sterling, VA (US); Ganghuai Wang, Fairfax, VA (US)

(73) Assignee: The Mitre Corporation, McLean, VA (US)

( * ) Notice: Subject to any disclaimer, the term of this patent is extended or adjusted under 35 U.S.C. 154(b) by 0 days.

(21) Appl. No.: 10/424,917

(22) Filed: Apr. 29, 2003

(51) Int. Cl.[7] .................................................. G06F 7/00
(52) U.S. Cl. .............................. 701/3; 701/16; 701/18; 701/301; 342/36
(58) Field of Search .................. 701/3, 4, 5, 6, 701/7, 8, 9, 10, 11, 16, 18, 300, 301, 302; 340/961, 972, 979, 995.19; 342/29, 36, 37

(56) References Cited

U.S. PATENT DOCUMENTS

| | | |
|---|---|---|
| 5,321,406 A | 6/1994 | Bishop et al. |
| 5,420,582 A | 5/1995 | Kubbat et al. |
| 5,459,469 A | 10/1995 | Schuchman et al. |
| 5,506,587 A | 4/1996 | Lans |
| 5,574,648 A | 11/1996 | Pilley |
| 6,006,158 A | 12/1999 | Pilley et al. |
| 6,081,764 A | 6/2000 | Varon |
| 6,097,315 A | 8/2000 | Minter |
| 6,161,097 A | 12/2000 | Glass et al. |
| 6,163,681 A | 12/2000 | Wright et al. |
| 6,173,159 B1 | 1/2001 | Wright et al. |
| 6,182,005 B1 | 1/2001 | Pilley et al. |
| 6,195,609 B1 | 2/2001 | Pilley et al. |
| 6,271,768 B1 * | 8/2001 | Frazier, Jr. et al. ......... 701/301 |
| 6,278,965 B1 | 8/2001 | Glass et al. |
| 6,311,108 B1 * | 10/2001 | Ammar et al. ................ 701/16 |
| 6,477,449 B1 * | 11/2002 | Conner et al. ................ 701/16 |
| 6,573,841 B2 * | 6/2003 | Price ............................ 701/16 |
| 6,600,977 B2 * | 7/2003 | Johnson et al. ............... 701/18 |

OTHER PUBLICATIONS

Terence S. Abbott, "Speed Control Law for Precision Terminal Area In-Trail Self Spacing"NASA/TM-2002-211742, Jul. 2002, pp. 1–10, Langley Research Center, Hampton, Virginia 23681-2199.

Anthony Warren et al., "Final Approach Throughput Analysis for Conventional and Enhanced Air Traffic Management", 2000, pp. 1–9, The Boeing Company, POB 3707, MS 20-09, Seattle WA 98124.

* cited by examiner

*Primary Examiner*—Richard M. Camby
(74) *Attorney, Agent, or Firm*—Rosenberg, Klein & Lee

(57) ABSTRACT

A method for coordinating numerous vehicles within a common maneuver is characterized by receiving, at a moving vehicle, state and projected maneuver information of other vehicles participating in the maneuver via a broadcast link and utilizing the information to control the trajectory of the moving vehicle based on predicted paths of all participating vehicles for future times for which the maneuver is to be conducted. For simple maneuvers, such as flight-deck based self-spacing of aircraft in a runway approach, the method allows each participating vehicle to virtually perform the coordinated maneuver by predictive simulation using current state data to determine if corrective measures need be undertaken, or, if the predicted maneuver shows that it would complete as planned, maintaining its current trajectory. This affords vehicle operators the freedom to perform other duties, as the operators are alerted only when a change in state is necessitated. In the runway approach problem, the state changes are primarily in a change of speed and the choice of a simple, stepped speed profile reduces the amount of speed control that must be attended to by aircraft flight crews, allows for fuel efficient flight profiles within constraints of solving the spacing problem, and allows for higher runway throughput as compared with the prior art.

53 Claims, 9 Drawing Sheets

METHOD FOR CONDUCTING A MOVING VEHICLE ALONG A TRAJECTORY OF A COORDINATED MANEUVER BASED ON STATE INFORMATION BROADCAST BY OTHER VEHICLES PARTICIPATING IN THE COORDINATED MANEUVER

FIELD OF THE INVENTION

The invention described herein is related to the field of vehicle guidance of multiple vehicles participating in common, coordinated maneuvers. More specifically, the present invention relates to a method for conducting a vehicle within constraints of a coordinated maneuver by providing state data of other vehicles participating in the maneuver through broadcast means and predicting the states of the vehicles for future times of the coordinated maneuver given the constraints thereof.

BACKGROUND OF THE INVENTION

The problem of coordinating multiple vehicles in a common maneuver is beset with complications of communication and control. These problems are compounded as the number of vehicles participating in the maneuver increases and by the complexity of the maneuver itself. Indeed, for extremely complex maneuvers, such as the ballet of multiple aircraft in precision military flight maneuvers, reliance is placed primarily on the aircraft pilot to make instantaneous decisions as automated control of the aircraft during such maneuvers is impractical.

For classes of simpler maneuvers, numerous systems and methods for coordinating vehicles within the maneuver have been investigated and implemented. One such system is disclosed in U.S. Pat. No. 6,271,768 to Fraser, Jr., et al., which provides a display for a dual mode Traffic Collision Avoidance System (TCAS)/Intra-Formation Position Collision Avoidance System (IFPCAS) and requires the cooperation of at least two formation follower aircraft in conjunction with a formation lead aircraft. The TCAS receives and processes broadcast data from another data link transponder that is located onboard another aircraft (e.g., a follower aircraft within a formation cell) to determine relative aircraft position of the host aircraft with respect to the other aircraft. The system includes a high-speed digital communication link that is operatively connected to a mission computer used to transmit steering commands to a transponder-equipped follower aircraft. The follower aircraft uses the steering commands to position itself with respect to the formation lead vehicle. Thus, each follower aircraft simply mimics commands from the formation lead aircraft to participate in the maneuver. Thus, if the lead aircraft were in some way disabled, the follower aircraft would no longer be able to participate in the maneuver via the established coordination mechanism.

Another simple coordinated maneuver which may benefit from coordination mechanisms is that of final approach spacing of aircraft at the runway of an airport. At busy terminal runways, it is imperative to land as many aircraft as can be safely achieved. During instrument flight conditions, significant constraints are placed on aircraft longitudinal separation on final approach. Aircraft spacing during such instrument flight conditions is primarily controlled by ground based air traffic controller judgment. At present, there are no significant aids available to assist the controller in optimizing spacing. During visual flight conditions, pilots are asked to adequately space themselves behind the aircraft in front of them. The pilot is asked to rely primarily on his own judgment through visual means. During both visual and instrument flight conditions, the lack of maneuver coordination automation tools to assist either the pilot or the controller results in an unnecessary under-utilization of potential runway capacity.

SUMMARY OF THE INVENTION

An object of the present invention is to provide a method for conducting a moving vehicle along a trajectory of a coordinated maneuver by: a) receiving state information from other vehicles participating in the maneuver over a broadcast communication link; b) using the state data of the other vehicles and the state data of the moving vehicle to predict the states of the participating vehicles at future times for which the maneuver is to be conducted; and, c) adjusting the state of the moving vehicle so that a predicted coordinated maneuver based on the adjusted state of the moving vehicle and the states of the other vehicles indicates a successful completion of the maneuver.

In one embodiment of the present invention, a projected coordinated maneuver is determined by forward time integration so as to predict the states of all participating vehicles at any given time from a current time to a future time in which the coordinated maneuver is predicted to complete, given the individual vehicle states at the current time as initial conditions and governed by constraints of control parameters known to all participating vehicles. This is generally accomplished by calculating the projected maneuver for the moving vehicle, designated as an own-vehicle, based on the own-vehicle state and forwardly integrating the state of the own-vehicle with respect to time, given the projected trajectories of the other vehicles participating in the maneuver to determine if the maneuver can be completed in compliance with the constraints of the control parameters. The projected maneuvers of the other vehicles are transmitted over broadcast links or may be calculated onboard the own-vehicle from the state data of the other vehicles provided thereto.

In a preferred embodiment of the present invention, the method is applied to controlling aircraft spacing on final approach to the runway of an airport and is controlled in the cockpit of the aircraft rather than dictated by ground-based controllers. The algorithm of the present invention produces a planned speed profile for the own-vehicle given known deceleration points and target air speeds at those deceleration points. State information from an aircraft preceding the own-vehicle in landing order, designated the lead-vehicle, is communicated to the own-vehicle via Automatic Dependent Surveillance Broadcasts (ADS-B), or via point-to-point data link communications. The algorithm revises the own-vehicle's speed profile, if necessary, to avoid potential or predicted violation of an applicable vehicle separation standard.

In a preferred embodiment, the speed profile of the participating vehicles is characterized by constant speed intervals between planned deceleration points. This allows the flight crew of the participating vehicles the freedom to perform other duties required for a safe landing without the need for continual speed adjustments. The algorithm further allows for fuel efficient flight profiles while simultaneously solving the optimal spacing problem. Moreover, the algorithm allows for higher runway throughput as compared with prior art final approach maneuvers.

BRIEF DESCRIPTION OF THE DRAWINGS

The objects defined above, as well as further advantages of the present invention, are best understood by referring to the following detailed description in conjunction with the accompanying Drawings, in which.

DETAILED DESCRIPTION OF PREFERRED EMBODIMENTS

Figure 1:
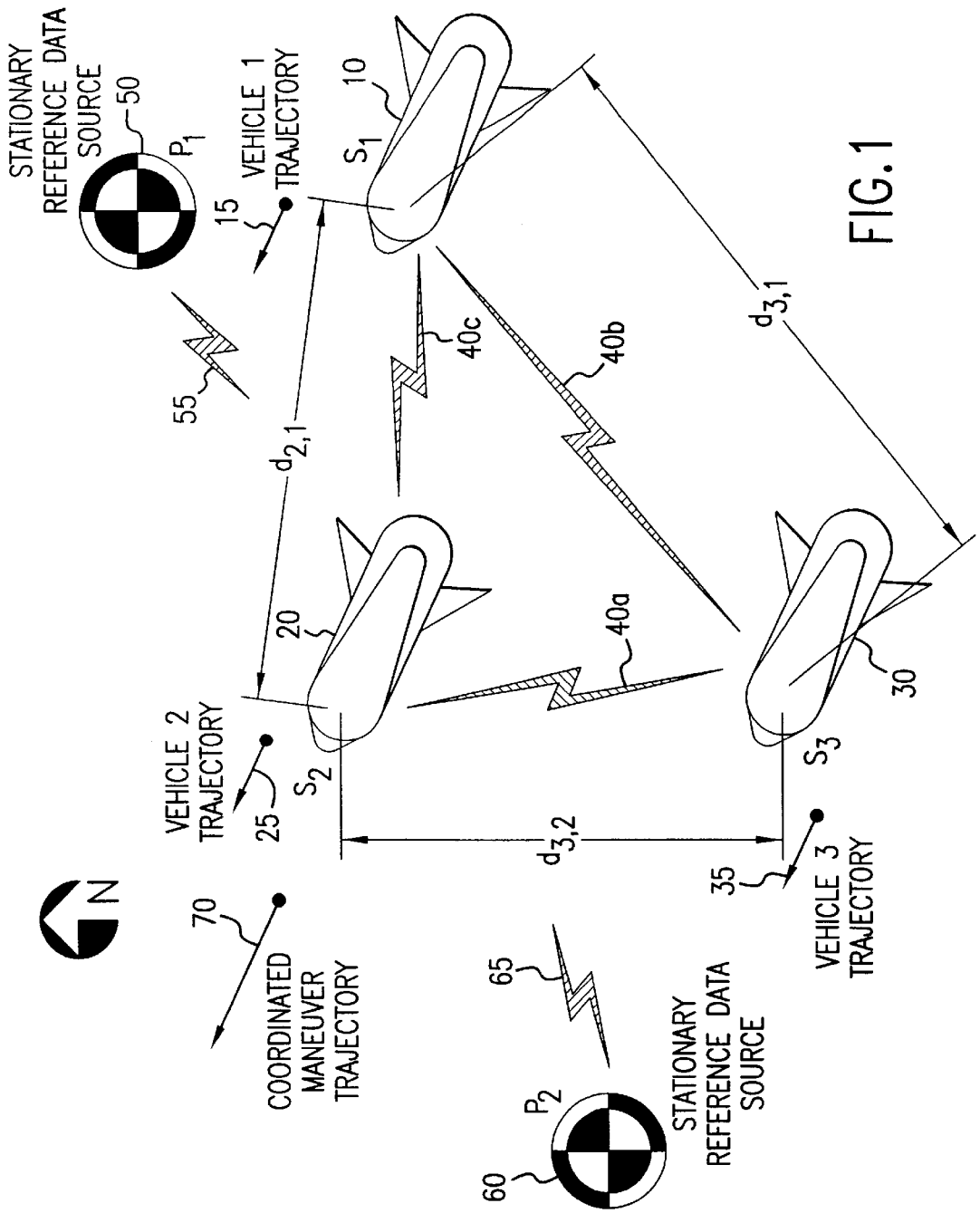
FIG. 1 is an illustration of a generic coordinated maneuver as performed by the present invention.

The present invention may be best understood by contemplating the configuration of FIG. 1 in which three generic vehicles 10, 20, 30 are participating in a common coordinated maneuver. The coordinated maneuver is in some way constrained or parameterized by a set of constraints or parameters known to all vehicles participating in the coordinated maneuver. For example, for the configuration of FIG. 1, the collection of generic vehicles 10, 20, 30 are to proceed on a common trajectory, e.g., coordinated maneuver trajectory 70, while maintaining a relative spacing between vehicles, e.g., $d_{2,1}$, $d_{3,1}$, and $d_{3,2}$. In physical implementations of the subject invention, vehicles 10, 20, 30 may be any kind of landcraft, watercraft, or aircraft.

At any given moment in time, the station of the individual vehicles 10, 20, 30 within the coordinated maneuver is determined by a vehicle state $S_1$, $S_2$, and $S_3$, respectively. An individual vehicle state may be a vector of scalar quantities defining the vehicle's position in space and current vehicle trajectory 15, 25, 35. The scalar quantities forming the state vector may include such quantities as the vehicle's latitude, longitude, altitude, elevation, heading, speed, etc.

Each vehicle 10, 20, 30 may derive its state $S_1$, $S_2$, $S_3$ from stationary reference data supplied by a plurality of stationary reference sources 50, 60 or from on-board instrumentation. The reference sources 50, 60 may include the global positioning satellite system, navigational buoys, airport operation centers, etc. It is to be noted that reference sources 50, 60 need not be stationary in space, but that the data they serve, i.e., the stationary reference data, must be stationary with respect to time. It is only necessary that each vehicle 10, 20, 30 be able to determine its state $S_1$, $S_2$, $S_3$ from the stationary reference data. The stationary reference data are broadcast from each stationary reference data source 50, 65 over broadcast links 55 and 65, respectively.

Each vehicle 10, 20, 30 participating in the coordinated maneuver continuously updates and maintains its respective state $S_1$, $S_2$, $S_3$. Additionally, each vehicle 10, 20, 30 broadcasts its state to other vehicles participating in the coordinated maneuver over broadcast links 40a, 40b, 40c.

Whereas broadcast links 40a, 40b, 40c are shown in FIG. 1 as individual links, states $S_1$, $S_2$, $S_3$ are broadcast from their respective vehicles 10, 20, 30 to all other vehicles in the vicinity, be those vehicles participating in the maneuver or not.

Furnished with its own state data and the states of the other vehicles participating in the coordinated maneuver, the individual vehicles 10, 20, 30 may adjust their respective states $S_1$, $S_2$, $S_3$ so as to follow a vehicle trajectory 15, 25, 35, respectively, that is prescribed by the coordinated maneuver as governed by a set of control parameters. For the configuration of FIG. 1, each vehicle 10, 20, 30 adjusts its respective state $S_1$, $S_2$, $S_3$ based upon the state information broadcast to it by the other vehicles participating in the coordinated maneuver over broadcast links 40a, 40b, 40c to maintain the coordinated maneuver trajectory 70 and inter-vehicle spacing $d_{2,1}$, $d_{3,1}$, $d_{3,2}$.

Figure 2:
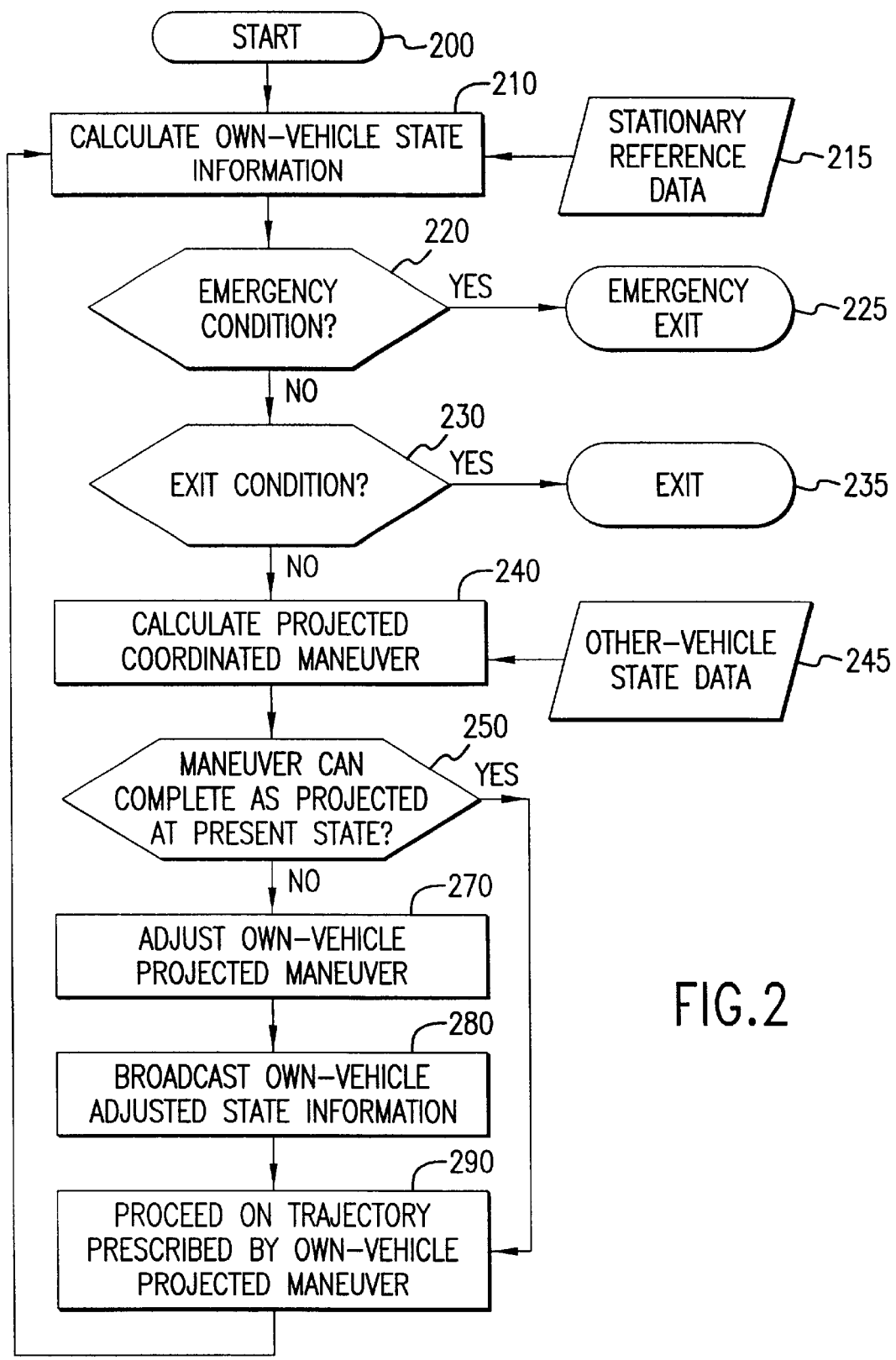
FIG. 2 is a flow diagram illustrating the method steps of the present invention.

The method of the subject invention is generally shown in the flow diagram of FIG. 2 with respect to the coordinated maneuver configuration of FIG. 1. Choosing an arbitrary reference vehicle, say vehicle 10, which we will designate as an own-vehicle, we shall refer to the other vehicles participating in the coordinated maneuver, i.e., vehicles 20 and 30, as other-vehicles. The algorithm is started in block 200 of FIG. 2, in which it is assumed that all vehicles participating in the maneuver are at station to perform the coordinated maneuver. That is to say, whereas the coordinated maneuver may have yet to begin, all vehicles that are to participate in the coordinated maneuver are at an initial state to begin the maneuver once the maneuver is started without any initial adjustment. As a specific example, if the vehicles are aircraft and the coordinated maneuver is a type of formation flight, it is assumed that the aircraft are in formation at the beginning of the algorithm.

In block 210, own-vehicle 10 determines its state $S_1$ from stationary reference data or from on-board instrumentation, indicated at input block 215. The own-vehicle state is evaluated in decision block 220 and is used to determine if the vehicle is in an emergency condition, e.g., one in which the vehicle is in danger of collision, losing its ability to stay afloat or aloft, putting vehicle occupants in harm's way, etc. If it is found that the vehicle is in an emergency condition, the algorithm is terminated in favor of an emergency exit procedure, as indicated at terminal block 225. Otherwise, flow is transferred to decision block 230, where the vehicle's station in the coordinated maneuever is evaluated with an exit condition. The exit condition is that for which own-vehicle 10 is required to leave the coordinated maneuver, i.e., the exit condition indicates that own-vehicle 10 has completed its portion of the coordinated maneuver and exits via a normal exit procedure as indicated at terminal block 235.

If own-vehicle 10 is neither at an emergency condition or an exit condition, it receives other-vehicle state data, as indicated at input block 245, from other-vehicles 20, 30 and uses the other-vehicle state data as well as the own-vehicle state to calculate a projected coordinated maneuver, as indicated at block 240. The projected coordinated maneuver is determined by a forward time integration, or other method, so as to predict the states of all participating vehicles at any given time from the current time to a future time in which the coordinated maneuver is predicted to complete, given the individual vehicle states $S_1$, $S_2$, $S_3$ at the current time as initial conditions and governed by the constraints of the control parameters. This is generally accomplished by calculating an own-vehicle projected maneuver based on own-vehicle state $S_1$ and forwardly integrating the state of the own-vehicle 10 with respect to time, given the projected trajectories of the other-vehicles to determine if the maneuver can be completed in compliance with the constraints of the control parameters for the initial given states $S_1$, $S_2$, $S_3$. The other-vehicle projected maneuvers are transmitted over broadcast links 40a, 40b, 40c with the other-vehicle state data, as indicated at input block 245.

If the coordinated maneuver can be completed as projected given the present vehicle states $S_1$, $S_2$, $S_3$ as determined in decision block 250, then the own-vehicle 10 proceeds on the trajectory prescribed by the own-vehicle projected maneuver as demonstrated in block 290. If the projected coordinated maneuver cannot be completed given the present vehicle states, adjustments to the states of one or more of the vehicles participating in the coordinated maneuver must be made at the corresponding vehicle so that the coordinated maneuver can complete.

If it is determined that the own-vehicle 10 is to adjust its state $S_1$, flow is transferred to block 270 where the adjustment is made. The own-vehicle state adjustment may be made in two steps. First, the own-vehicle state $S_1$ is adjusted by a predetermined amount. Following the adjustment, a new own-vehicle projected maneuver is calculated based thereon. The new own-vehicle projected maneuver is subject to the constraints of the coordinated maneuver through the coordinated maneuver control parameters. Once the own-vehicle state $S_1$ has been adjusted, the adjusted state information is broadcast over broadcast links 40a, 40b, 40c to the other-vehicles as indicated at block 280. The own-vehicle 10 then proceeds along the trajectory 15 prescribed by the own-vehicle projected maneuver, as indicated in block 290, and thereafter, flow is transferred to block 210, where the algorithm steps are repeated.

The present invention may be further understood by way of a specific implementation, the description of which will now be detailed. In a preferred embodiment, the method of the instant invention is employed to make better use of current airport runway capacity by allowing flight crews to effectively space their aircraft on final approach at an airport. This particular implementation of the present invention uses inputs of state information (position and velocity) on both an approaching aircraft, designated as own-ship, and a predecessor aircraft, designated as lead-ship, in the aircraft arrival stream of an airport. The coordinated maneuver is the controlled aircraft spacing on final approach to the runway of an airport. The aircraft spacing is controlled in the cockpit rather than dictated by ground-based controllers. The algorithm of the present invention produces a planned speed profile for the own-ship given known deceleration points and target air speeds at those deceleration points. In a preferred embodiment, state information from the lead-ship is communicated to the own-ship via a broadcast link such as Automatic Dependent Surveillance Broadcast (ADS-B) and/or via point-to-point data link communications. Additionally, in a preferred embodiment, both lead-ship and own-ship operate under the algorithm of the present invention.

The method of the instant invention is situationally adaptive and, in the final approach spacing implementation, two alternative operational situations are anticipated. If weather conditions are such that flight operations are to be conducted under visual meteorological conditions (VMC), the algorithm adjusts the approach of the own-ship such that a minimum aircraft inter-arrival time is not violated. If weather conditions are such that flight operations are to be conducted under instrument meteorological conditions (IMC), the algorithm adjusts the approach path of the trailing aircraft such that instrument flight rules (IFR) minimum separation requirements are not violated.

Figure 5:
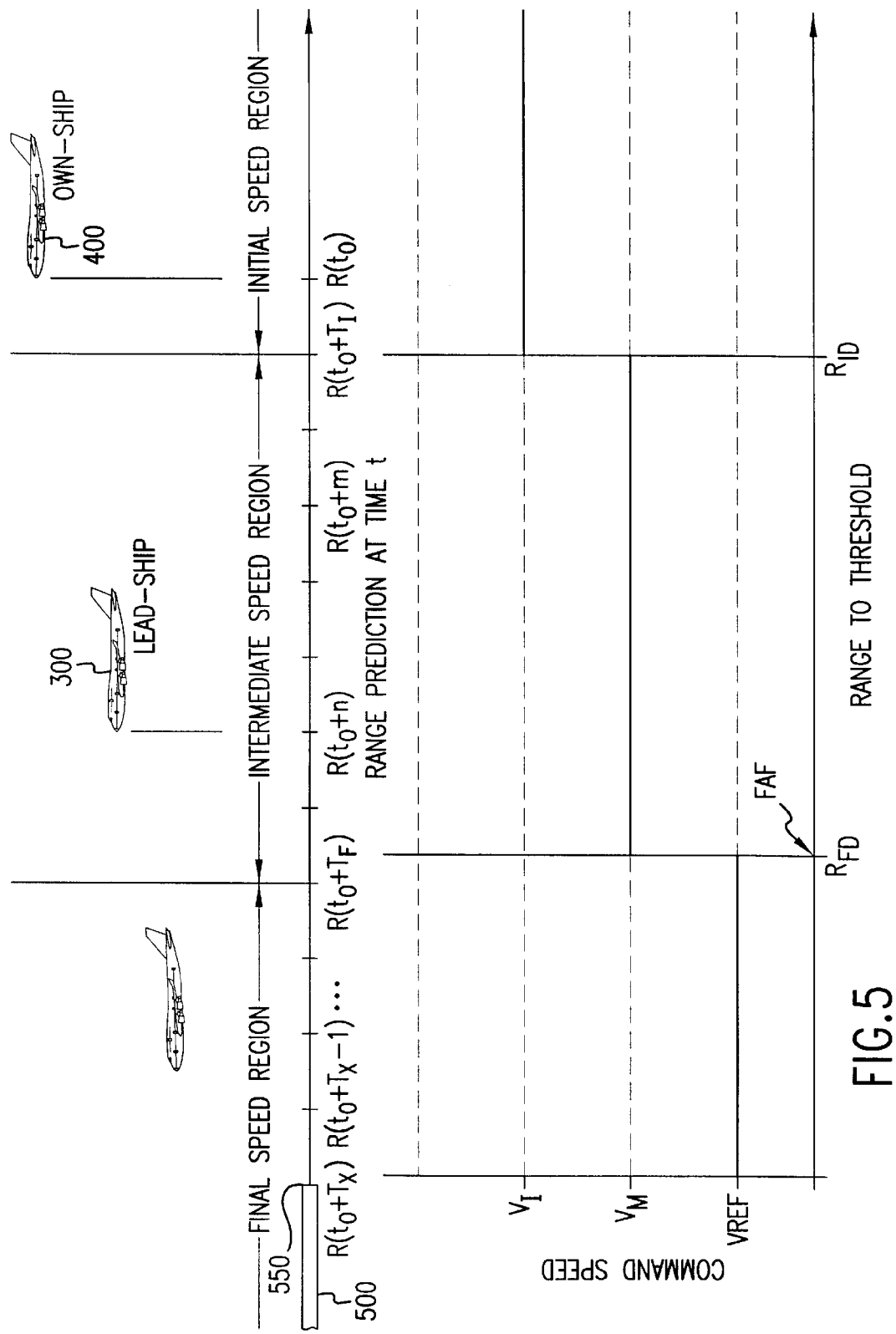
FIG. 5 is an illustration of a planned speed profile as provided by a preferred embodiment of the present invention.

As previously stated, the instant invention provides speed plans or profiles of both lead-ship and own-ship. The algorithm revises the own-ship's speed profile, if necessary, to avoid potential or predicted violation of the applicable separation standard. The speed profile is characterized by constant speed intervals between planned deceleration points which allows the flight crew the freedom to perform other duties required for a safe landing without the need for continual speed adjustments. A sample nominal speed profile is illustrated in FIG. 5, a detailed discussion of which will be given in the paragraphs that follow.

Figure 3:
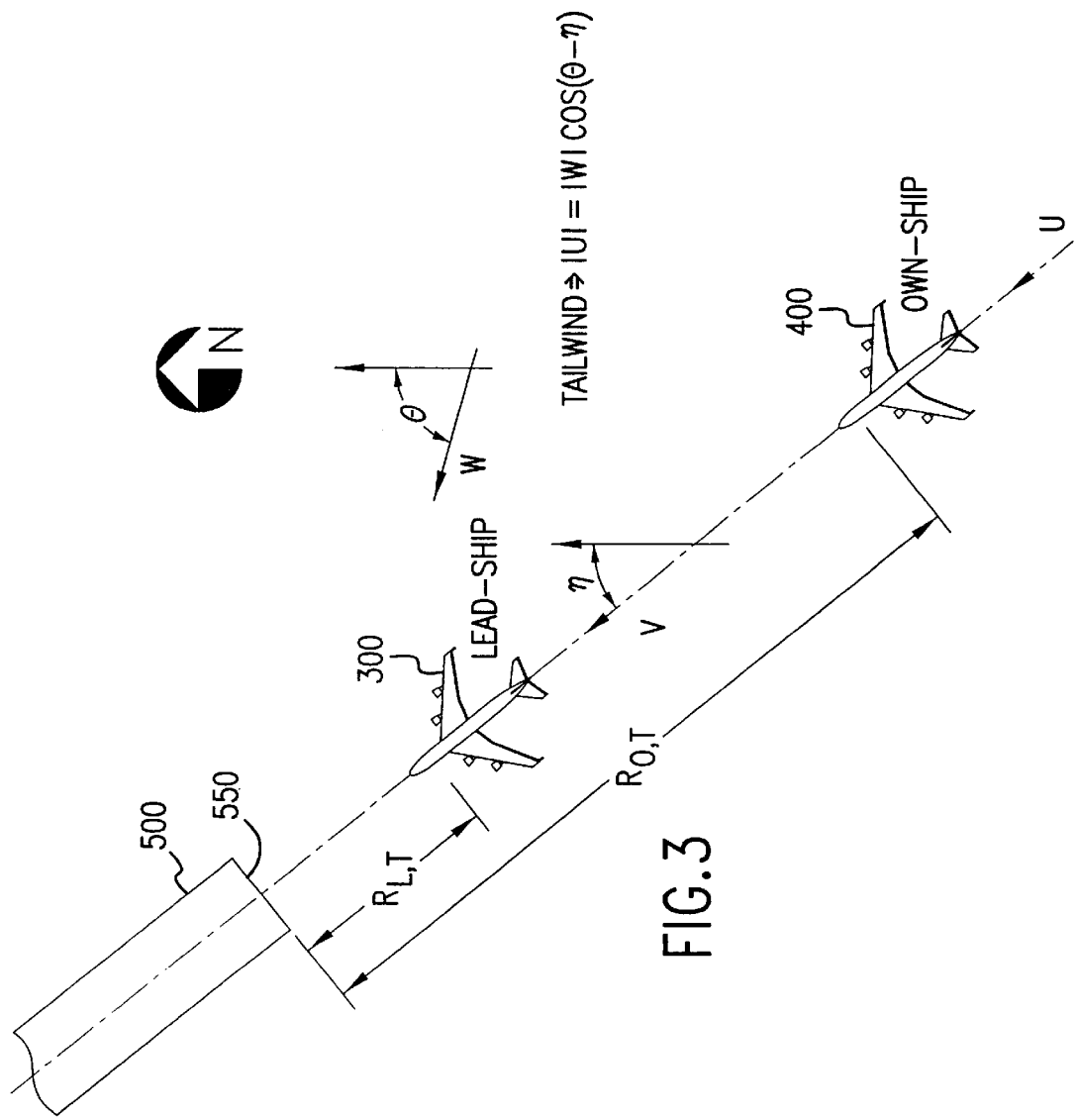
FIG. 3 is an illustration of the geometry of the flight-deck based final approach maneuver as performed by a preferred embodiment of the present invention.
Figure 4:
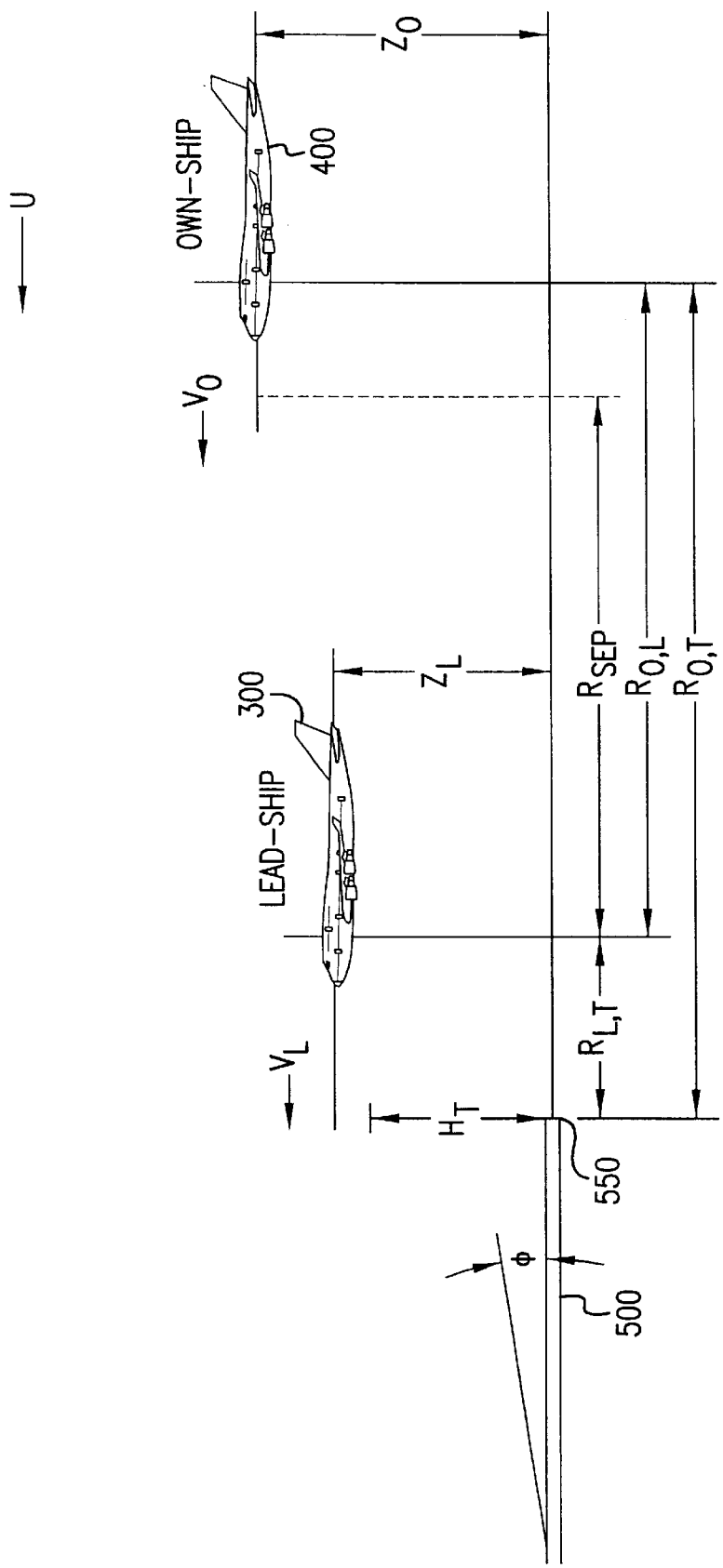
FIG. 4 is an illustration providing more details of the geometry of the flight-deck final approach maneuver as performed by a preferred embodiment of the present invention.

A typical configuration for final approach spacing of aircraft at a runway of an arbitrary airport is illustrated in FIG. 3 and FIG. 4. As is shown in the Figures, lead-ship 300 and own-ship 400 are aligned with runway 500 and are proceeding in the direction thereof along a velocity vector V (hereinafter the subscript "L" will indicate parameters associated with the lead-ship and the subscript "O" will indicate parameters associated with the own-ship, e.g., $V_L$ indicates the velocity vector of the lead-ship 300 and $V_O$ indicates the velocity vector of the own-ship 400). The velocities of the lead-ship 300 and own-ship 400 are influenced by a tailwind U, the magnitude of which is simply the wind speed, i.e., the magnitude of wind vector W multiplied by the cosine of the difference of the wind direction angle θ and the course heading of the aircraft η.

Runway 500 is terminated at one end thereof by runway threshold 550, which serves as the reference point of arrival for approaching aircraft. The aircraft descend upon the runway at a known glide slope angle φ thereby crossing runway threshold 550 at a nominal height $H_T$.

At an arbitrary instant of time, the position of the lead-ship 300 may be given as its range to threshold $R_{L,T}$ and altitude above ground level (AGL) $Z_L$. Likewise, the position of the own-ship 400 is given by its range to threshold $R_{O,T}$ and altitude AGL $z_O$. Thus, the two aircraft are separated by a separation distance or range $R_{O,L}$ which may never be less than a minimum separation standard $R_{SEP}$. As previously stated, the algorithm produces a speed profile which maintains the minimum separation distance while simultaneously slowing the speed of the aircraft to a recommended safe landing speed. Additionally, as discussed hereinabove, the algorithm may control the approaching aircraft to cross runway threshold 550 in accordance with a minimum aircraft inter-arrival time, i.e., the minimum time which must elapse for a trailing aircraft to cross runway threshold 550 as measured from the time an immediately preceding aircraft crosses runway threshold 550.

A nominal speed profile in accordance with a preferred embodiment of the present invention is illustrated in FIG. 5. As is illustrated, the coordinated maneuver of flight deck based final approach spacing is conducted via a step-down in aircraft velocity throughout the approach of the aircraft. The nominal speed of the aircraft is adjusted at the interface of a plurality of speed regions. For the configuration of FIG. 5, the final approach is broken down into three speed regions: an initial speed region in which an aircraft maintains a nominal speed of $V_I$; an intermediate speed region in which an aircraft maintains a nominal air speed of $V_M$; and a final speed region in which an aircraft must reduce its speed to VREF. As is shown in the Figure, the interface between the initial speed region and the intermediate speed region, which shall be known as the intermediate deceleration point or range, is located at a range $R_{ID}$ from runway threshold 550. Similarly, the interface between the intermediate speed region and the final speed region, designated the final deceleration range or point, or commonly, the final approach fix (FAF), is located at a range $R_{FD}$ from runway threshold 550. The nominal speed profile is characterized by abrupt speed adjustments at the deceleration points and by a constant speed between deceleration points. Thus, between deceleration points, the flight crew need not make speed adjustments (unless instructed to do so by the algorithm, as will be discussed in detail in paragraphs that follow) thus freeing the flight crew for other duties. Therefore, whereas any number of deceleration points may be used and still fall within the scope of the present invention, a minimum number of deceleration points should be employed so as to free the flight crew for other details of the landing procedure.

At an arbitrary point of time, t, own-ship 400 may evaluate its performance in the coordinated maneuver of landing onto runway 500 while maintaining the applicable minimum safety standard with respect to lead-ship 300 by predicting its speed and range as a function of time in accordance with a predicted speed profile. Given $R_{ID}$, $R_{FD}$, $R_{SEP}$, or alternatively, the minimum inter-arrival time $\Delta T_{SEP}$, own-ship 400 calculates, by forward time integration, its position and speed as well as that of lead-ship 300 and monitors the predicted separation for compliance with the established minimum safety separation standard. The predicted speed profile for the lead-ship 300 is broadcast by lead-ship 300 using the established broadcast link (preferably ADS-B).

Generally, the forward integration begins with the knowledge of the speed $V_O(t_0)$ and position $R_O(t_0)$ of own-ship 400 in the initial speed region. Then, for fixed increments in an independent time variable, preferably one second, a new speed, $v_O(t_0+\Delta t)$, and range from threshold 550, $R_O(t_0+\Delta t)$, are calculated in accordance with the stepped velocity profile. Thus, as illustrated in FIG. 5, at some point in time $T_I$ in the forward integration, own-ship 400 is at range $R_{ID}$ and must then decrease its speed to a minimum of $V_M$. Similarly, at time $T_F$ in the forward integration, own-ship 400 is predicted to be at range $R_{FD}$ and must then decrease its speed to VREF. As discussed hereinabove, between deceleration ranges, own-ship 400 proceeds on its trajectory at a constant speed unless directed by the algorithm to do otherwise.

A similar time integration for the velocity $v_L(t)$ and range $R_L(t)$ for lead-ship 300 is performed and supplied to the algorithm being executed on own-ship 400. As discussed previously, the predicted speed profile of lead-ship 300 is broadcast to own-ship 400 over a broadcast link.

Having the predicted range and velocity of both aircraft as a function of time, own-ship 400 may then determine if the applicable minimum separation standard is violated at any point along the final approach of own-ship 400. If a violation is predicted, own-ship 400 adjusts its own predicted speed plan through a change of state, e.g., a change in velocity, so that the predicted violation is avoided. Own-ship 400 then broadcasts the revised speed plan to other aircraft in the vicinity so that the revised speed plan may be utilized by other aircraft operating under the algorithm of the instant invention.

Figure 6A:
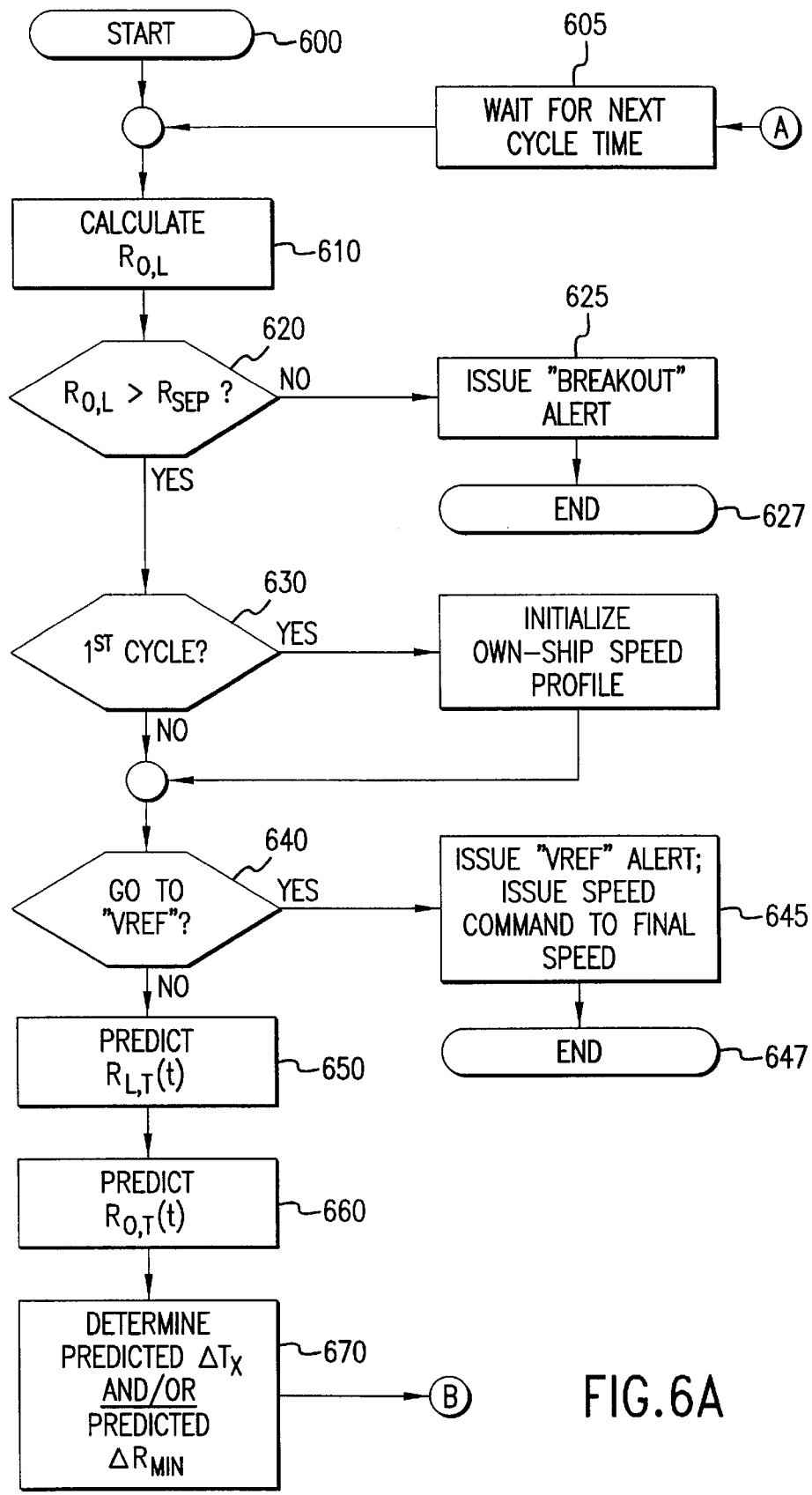
FIGS. 6A, 6B, 6C are flow diagrams illustrating the method steps of the flight-deck final approach maneuver as performed by a preferred embodiment of the present invention; and, FIG. 7 is an illustration of the speed profile of a preferred embodiment of the present invention as compared with the prior art.
Figure 6B:
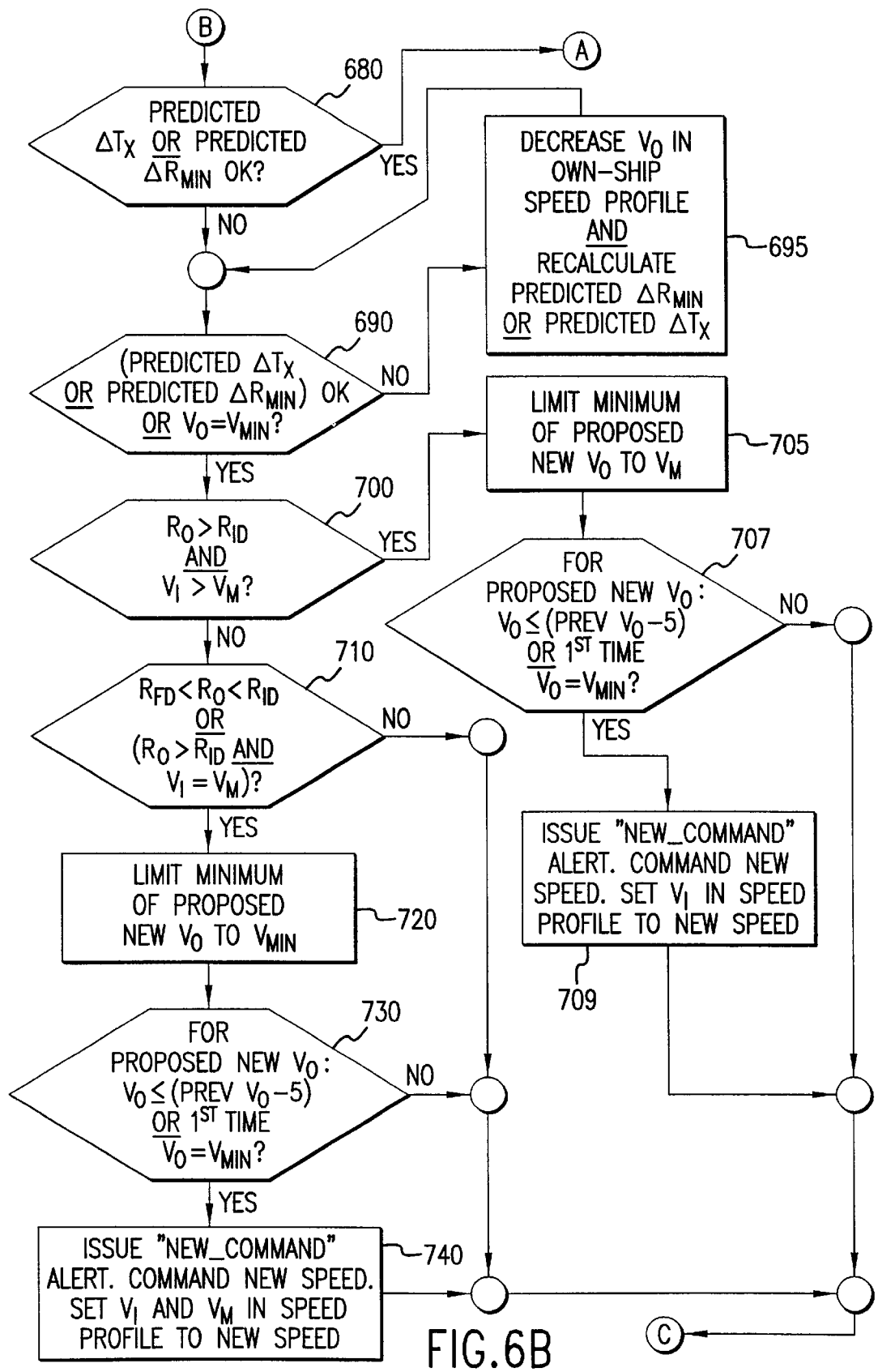
Figure 6C:
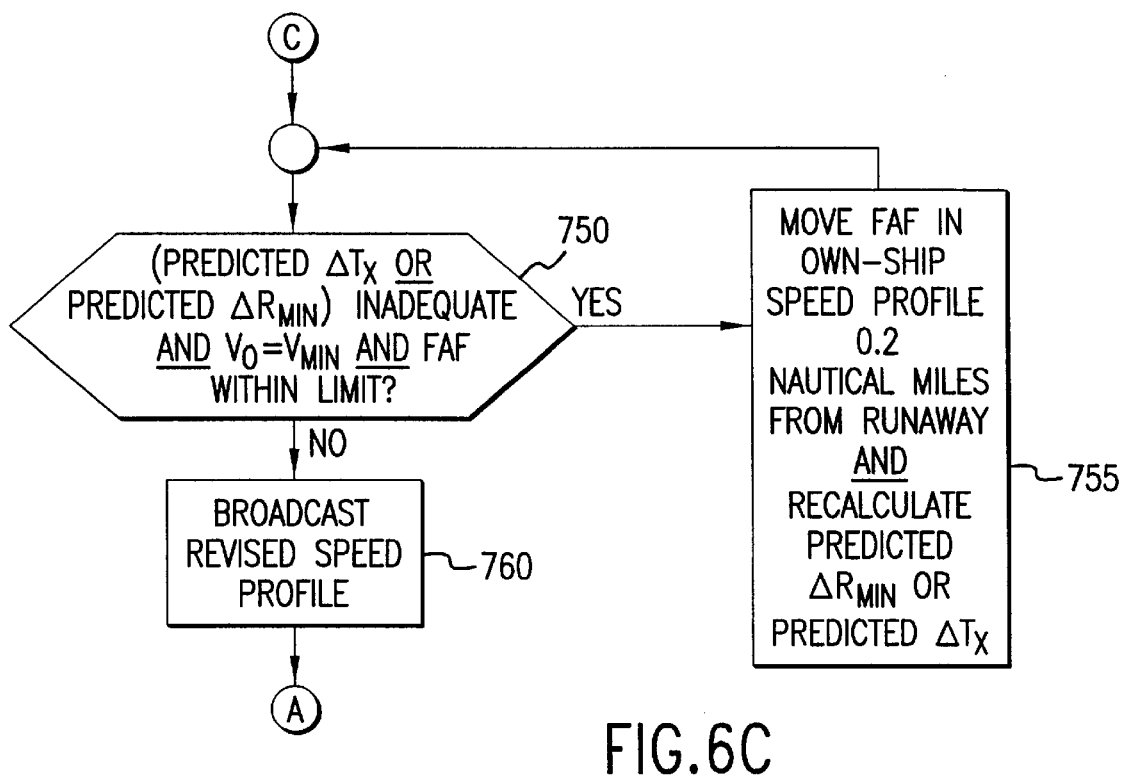

The method of the present invention, as applied to flight deck based final approach spacing of aircraft, is diagrammatically portrayed in the flow diagrams of FIGS. 6A, 6B, and 6C. The method begins at block 600 where, as discussed previously, it is assumed that the aircraft are in position to make the final approach maneuver. Furthermore, each aircraft is supplied with a nominal speed profile composed of an initial speed $V_I$, an intermediate speed $V_M$, a final speed $V_{REF}$, an intermediate deceleration range $R_{ID}$ and a final deceleration range $R_{FD}$. Deferring the discussion of the right-hand branch of the diagram, flow is transferred to block 610 wherein the current separation between the lead-ship 300 and the own-ship 400, i.e., $R_{O,L}$ is calculated based upon the state of own-ship 400 and the state of lead-ship 300 as received by the own-ship 400 over a broadcast link. However, the state data of lead-ship 300 may be from a broadcast of an earlier algorithm cycle and the current and correct position of lead-ship 300 must therefore be calculated based on the time difference, lead-ship heading and lead-ship ground speed. The distance the lead-ship 300 travels during the time period between the broadcast time and the present time is calculated by $$\Delta S_L = (t_0 - t_{broadcast}) \cdot v_{L,GND}.$$

The current position (latitude and longitude) of lead-ship 300 is then calculated using a common aviation formula known in the art based upon the course heading of lead-ship 300, the latitude and longitude of lead-ship 300 in its broadcast state data and $\Delta s_L$ calculated above. If the separation between lead-ship 300 and own-ship 400 is less than the applicable separation standard, the algorithm of the present invention issues a BREAKOUT alert, which instructs the pilot to perform a BREAKOUT procedure to abort the approach as indicated at block 625. The algorithm is then terminated as indicated by terminal block 627.

If it is determined that the separation distance is adequate, flow is transferred to decision block 630 where it is ascertained if the algorithm is executing its first cycle since being started. If it was found in decision block 630 that the algorithm's first cycle is in progress, the own-ship speed profile requires initialization, which is performed at block 635.

The initialization procedure of the own-ship speed profile considers the speed region in which own-ship 400 is located and sets the speed of the nominal speed profile accordingly. If the indicated air speed (IAS) of own-ship 400 $v_O$ is greater than the initial speed $V_I$ in the nominal speed profile, then the value of the current IAS of own-ship 400 is assigned to the initial speed of the nominal profile of own-ship 400 is not changed from the value that was set at the start of the algorithm. If the current position of own-ship 400 is in the intermediate speed region, then the value of the current IAS of own-ship 400 is assigned to the intermediate speed in the nominal speed profile $V_M$ if the IAS is greater than the intermediate speed of the nominal speed profile and remains unchanged otherwise. If the current position of own-ship 400 is in the final deceleration region, nothing is done further to initialize the speed profile.

Once the own-ship speed profile has been initialized, or if the algorithm is running beyond its first cycle, flow is transferred to decision block 640 in which a determination is made if own-ship 400 should immediately go to VREF. An approaching aircraft usually begins to decelerate to a final speed after it arrives at the final deceleration point (commonly known as FAF). But, if the aircraft is flying at a high speed before reaching the FAF, it may need to start to decelerate to final speed earlier. Thus, if the aircraft is in the final speed region, then it should go to VREF. If the aircraft is not in the final speed region, the algorithm predicts the speed of own-ship 400 at a range of 3 nautical miles (NM) from the runway threshold by assuming that the own-ship 400 starts to decelerate at its maximum allowed deceleration rate beginning at its current position. If that speed is greater than VREF, then own-ship 400 should start to go to VREF at the instant at which the determination is made, and flow is then transferred to block 645. In block 645, the algorithm issues a VREF alert which indicates to the pilot to start to decelerate to VREF. The algorithm further issues a speed command to the pilot to set the own-ship speed $v_O$ to VREF. Since VREF is an exit condition of own-ship 400, the algorithm terminates as indicated by terminal block 647.

As discussed hereinabove, the control parameters of the coordinated final approach maneuver are the predicted minimum separation between lead-ship 300 and own-ship 400 during IMC and predicted inter-arrival time at the runway threshold during VMC. The prediction is performed in three steps: the range between lead-ship 300 and the runway threshold 550 is predicted as a function of time ($R_{L,T}(t)$; block 650); the range between own-ship 300 and the runway threshold 550 is predicted as a function of time ($R_{O,T}(t)$; block 660), and the predicted minimum separation between lead-ship 300 and own-ship 400 is predicted (for IMC; $\Delta R_{MIN}$) and/or the inter-arrival time at the runway threshold is predicted (for VMC; $\Delta T_X$) as indicated at block 670.

To calculate a predicted $R_{L,T}(t)$ on own-ship 400, it is assumed that the state of lead-ship 300 has been communicated over a broadcast link to own-ship 400. It is further assumed that the planned speed profile of lead-ship 300 is also 400. It is further assumed that the planned speed profile of lead-ship 300 is also known to own-ship 400, such as by being received directly from lead-ship 300 over a broadcast link. In a preferred embodiment, the lead-ship's state and planned profile are provided by ADS-B functions, but may be communicated by other communication and surveillance mechanisms. It is also assumed that the maximum deceleration rate of lead-ship 300, MAX_DECEL_RATE, the maximum acceleration rate of lead-ship 300, MAX_ACCEL_RATE, current IAS of lead-ship 300, $V_L$, the current range of the lead-ship to the runway threshold, $R_{L,T}$, are known to own-ship 400. It is further understood that the information on the airport, e.g., airport elevation, glide slope, altimeter setting, etc., are readily available to own-ship 400 by standard means.

The aircraft range to threshold time integration procedure is an iterative routine based on basic Newtonian motion equations:

$$R(t)=R(t_0)+vt+0.5at^2,$$

and $$v(t)=v(t_0)+at$$

The iterative routine is first initialized by setting the speed of lead-ship 300, $v_L$, equal to the current IAS of lead-ship 300, establishing a reference time $t_0$, setting the projected lead-ship range, $R_{L,T}(t_0)$, equal to the current range of lead-ship 300 from the runway threshold. Then, while $R_{L,T}(t)>0$, i.e., until the predicted position of the lead-ship 300 crosses the runway threshold 550, the following calculations are performed:

1. Establish whether lead-ship 300 is to go to VREF. This test is similar to the one described hereinabove. If lead-ship 300 is to go to VREF, then the deceleration rate is calculated as:

$$a_L(t)=\min(\text{MAX\_DECEL\_RATE}, v_L(t)-VREF+X)$$

where,
   min(a,b) returns the smaller value among a and b, and
   X is an offset value for the purposes of providing a safety buffer.

It causes the appearance that the lead ship is decelerating at a faster rate.

2. If lead-ship 300 is in the initial speed region, then the deceleration rate is calculated as follows:
   If $v_L(t)>V_I$, then $$a_L(t)=\min(v_L(t)-V_I, \text{MAX\_DECEL\_RATE}).$$

Otherwise, $$a_L(t)=-\min(V_1-v_L(t), \text{MAX\_ACCEL\_RATE}).$$

3. If lead-ship 300 is in the intermediate speed region, then the deceleration rate is calculated as follows:
   if $v_L(t)>V_M$, then $$a_L(t)=\min(v_L(t)-V_M, \text{MAX\_DECEL\_RATE}).$$

Otherwise, $$a_L(t)=-\min(V_M-v_L(t), \text{MAX\_ACCEL\_RATE}).$$

4. If cases 1–3 do not apply, set $a_L(t)=0$.

5. Calculate the assumed altitude of lead-ship 300 as a function of the glide slope angle for the runway:

$$z_L(t)=z_{AP}+H_T+R_{L,T}(t)\tan(\phi),$$

where,
   $z_{AP}$ is the airport elevation in feet,
   $H_T$ is the nominal height of the aircraft over runway threshold 550, and
   $\phi$ is the glide slope of the aircraft approach.
   If the current actual altitude of lead-ship 300 as transmitted to own-ship 400 is below $Z_L(t)$ calculated above, the current actual altitude of lead-ship 300 is assigned to $Z_L(t)$.

6. Calculate the current tailwind at the position of lead-ship 300:

$$u=w\cdot\cos(\theta-\eta),$$

where, u is the tailwind component in the direction of the aircraft approach,
   w is the current wind speed,
   $\theta$ is the current wind direction, and
   $\eta$ is the course heading of the approach.

7. Calculate the true air speed (TAS), $V_{L,TRUE}(t)$, for lead-ship 300 using standard conversions from the indicated air speed of lead-ship 300. The calculation requires the use of the altitude of lead-ship 300, $z_L(t)$, as well as the current altimeter setting acquired from the airport. Such conversions are well-known in the art and will not be discussed further here.

8. Calculate the ground speed for lead-ship 300:

$$v_{L,GND}(t)=v_{L,TRUE}(t)+u.$$

9. Calculate the deceleration rate in ground coordinates by converting $a_L(t)$ from indicated coordinates to ground coordinates:

$$a_{L,GND}(t)=a_L(t)\cdot\frac{v_{L,TRUE}(t)}{v_L(t)}$$

10. Calculate the lead aircraft range at the current time:

$$R_{L,T}(t) = R_{L,T}(t-\Delta t) - v_{L,GND}(t) \cdot \Delta t - 0.5 \cdot \Delta t^2 \cdot a_{L,GND}(t).$$

In a preferred embodiment, $\Delta t$ is set to one second. A new predicted IAS of lead-ship 300 is calculated by:

$$v_L(t) = v_L(t-\Delta t) - a_L(t) \cdot \Delta t.$$

11. Store the value $R_{L,T}(t)$ to an array. Increment t by an amount $\Delta t$. Repeat the loop at step 1.

When the predicted range to threshold of lead-ship 300 indicates that lead-ship 300 has crossed the runway threshold 550, the value of the time variable t at that time, $T_{X,L}$ is stored for later calculation.

Once the predicted range to threshold function, $R_{L,T}(t)$, has been calculated, flow is transferred to block 660 where the own-ship range to threshold function $R_{O,T}(t)$ is calculated. The calculation for $R_{O,T}(t)$ proceeds in like manner as that of $R_{L,T}(t)$.

The iterative routine is first initialized by setting the speed of own-ship 400, $v_O$, equal to the current IAS of own-ship 400, establishing a reference time $t_0$, setting the projected own-ship range, $R_{O,T}(t_0)$, equal to the current range of own-ship 400 from the runway threshold. Then, while $R_{O,T}(t) > 0$, i.e., until the predicted range of the own-ship 300 crosses the runway threshold 550, the following calculations are performed:

1. Establish whether own-ship 400 is to go to VREF. If own-ship 400 is to go to VREF, then the deceleration rate is calculated as:

$$a_O(t) = \min(\text{MAX\_DECEL\_RATE}, v_O(t) - \text{VREF} - X).$$

2. If own-ship 400 is in the initial speed region, then the deceleration rate is calculated as follows:
   If $v_O(t) > V_I$, then $$a_O(t) = \min(v_O(t) - v_0(t), \text{MAX\_DECEL\_RATE}).$$

Otherwise, $$a_O(t) = -\min(v_0 - v_0(t), \text{MAX\_ACCEL\_RATE}).$$

3. If own-ship 400 is in the intermediate speed region, i.e., $R_{FD} < R_0(t) < R_{ID}$ then the deceleration rate is calculated as follows:
   3.1 If $R_{O,T}(t_0) \geq R_{ID}$, then
      if $v_O(t) > V_M$, then $$a_O(t) = \min(v_O(t) - V_M, \text{MAX\_DECEL\_RATE}).$$

Otherwise, $$a_O(t) = -\min(V_M - v_O(t), \text{MAX\_ACCEL\_RATE}).$$

3.2 If $R_{O,T}(t_0) < R_{ID}$, then
      if $v_0(t) > v_0(t_0)$, then $$a_0(t) = \min(v_0(t) - v_0(t_0), \text{MAX\_DECEL\_RATE})$$

Otherwise, $$a_0(t) = \min(v_0(t_0) - v_0(t), \text{MAX\_DECEL\_RATE}$$

4. If cases 1–3 do not apply, said $a_O(t) = 0$.
5. Calculate the assumed altitude of own-ship 400 as a function of the glide slope angle for the runway:

$$z_O(t) = z_{AP} + H_T + R_{O,T}(t) \tan(\phi),$$

If the current actual altitude of own-ship 400 is below $z_O(t)$ calculated above, the current actual altitude of own-ship 400 is assigned to $z_O(t)$.

6. Calculate the current tailwind at the position of own-ship 400:

$$u = w \cdot \cos(\theta - \eta),$$

7. Calculate the true air speed (TAS), $V_{O,TRUE}(t)$, for own-ship 400 using standard conversions from the indicated air speed of own-ship 400.

8. Calculate the ground speed for own-ship 400:

$$v_{O,GND}(t) = v_{O,TRUE}(t) + u.$$

9. Calculate the deceleration rate in ground coordinates by converting $a_O(t)$ from indicated coordinates to ground coordinates:

$$a_{O,GND}(t) = a_O(t) \cdot \frac{v_{O,TRUE}(t)}{v_O(t)}.$$

10. Calculate the own aircraft range at the current time:

$$R_{O,T}(t) = R_O(t - \Delta t) - v_{O,GND}(t) \cdot \Delta t - 0.5 \cdot \Delta t^2 \cdot a_{O,GND}(t).$$

The own-ship range to threshold is stored as a function of time for later calculations. A new predicted IAS of own-ship 400 is calculated by:

$$v_O(t) = v_O(t - \Delta t) - a_O(t) \cdot \Delta t.$$

11. Store the value $R_{O,T}(t)$ to an array. Increment t by an amount $\Delta t$. Repeat the loop at step 1.

To calculate the predicted minimum separation between aircraft, $R_{O,L}(t)$ for IMC and/or the predicted inter-arrival time at the runway threshold, $\Delta T_X$, as indicated at block 670, a two-pronged approach is preferred. First, during the integration from $t = t_0$ to $t = T_{X,L}$, the separation between own-ship 400 and lead-ship 300 is given by:

$$R_{O,L}(t) = R_{O,T}(t) - R_{L,T}(t).$$

The minimum separation from $t = t_0$ to $t = T_{X,L}$ is recorded as $\Delta R_{MIN}$, the projected minimum separation between lead-ship 300 and own-ship 400 throughout the approach. Then, the remainder of the own-ship's approach is integrated until own-ship 400 crosses runway threshold 550. The threshold crossing time designated $T_{X,O}$, is noted and the inter-arrival time $\Delta T_X$, is the difference of the two arrival times, $$\Delta T_X = T_{X,O} - T_{X,L}.$$

When the applicable aircraft separation has been determined, flow is transferred to decision block 680 where it is ascertained if the predicted separation is in compliance with the applicable separation standard. If so, flow is transferred to block 605, where the algorithm is held in a wait state for the next cycle time to begin, followed thereafter by a new cycle at block 610. If, however, the aircraft separation does not meet the applicable safe separation standard, then the speed profile of own-ship 400 requires adjustment. The algorithm is capable of adjusting the approach parameters of own-ship 400 to control either separation in range or inter-arrival time. During IMC, specific separations are required by existing air traffic control procedures. During VMC, no specific separation standards presently exist, so it is possible to use time as a criteria for separation during approaches.

Ultimately, it is expected that air traffic control procedures will evolve to make use of inter-arrival time as a separation standard in IMC.

If distance criteria are to be applied, the projected minimum separation, $\Delta R_{MIN}$, is compared with the separation standard, $R_{SEP}$. Separation standards for runway approaches depend on the weight category of the aircraft. The weight category of both lead-ship 300 and own-ship 400 are assumed to be provided to the method of the present invention. In a preferred embodiment, the lead-ship weight category is transmitted through the ADS-B system.

If the minimum separation, $\Delta R_{MIN}$ is less than the separation standard, $R_{SEP}$, then the algorithm proceeds so as to potentially decrease the speed in the planned approach of own-ship 400. Otherwise, the algorithm waits until the next cycle and thereafter restarts the algorithm. If time-based criteria are to be applied, the projected threshold inter-arrival time, $\Delta T_X$, is compared with a goal threshold inter-arrival time, $\Delta T_{MIN}$. If $\Delta T_X$ is less than $\Delta T_{MIN}$ minus some predetermined offset value, then the algorithm proceeds so as to decrease the speed in the speed plan of own-ship 400. If the projected threshold's inter-arrival time $\Delta T_X$ is greater than the goal time, $\Delta T_{MIN}$, plus an offset value, then the algorithm proceeds so as to increase the speed in the speed plan of own-ship 400. Otherwise, the algorithm waits until the next cycle at block 605 and proceeds thereafter to the top of the algorithm.

The remainder of the detailed discussion of the algorithm of the instant invention will use the minimum range spacing between aircraft, $\Delta R_{MIN}$, as the separation standard. The procedure is the same when using the inter-arrival time separation standard, i.e., only the separation standard and the associated evaluation step differs between the minimum spacing and inter-arrival time procedures.

The algorithm assumes a minimum allowed speed, $V_{MIN}$, during the approach, the specific value of this minimum speed is likely to be a ship dependent, adaptation parameter value that is assigned to a particular aircraft and is set at installation time. A typical value is in the range of 150 knots. Similarly, a maximum value will also be set as an adaptation parameter.

If own-ship 400 is flying at the minimum allowed speed, then, as will be shown, the flow of the algorithm proceeds to decision block 750. Otherwise, a trial plan is evaluated by projecting the inter-aircraft separation assuming a decreased speed in the own-ship's planned speed profile through the approach. In a preferred embodiment, the projected speed profiles are evaluated at one knot decrements in planned speeds. The decremented speeds do not affect the planned final approach speed, however, it only potentially affects the current target speed, the initial speed, and the intermediate speeds in the planned speed profile of own-ship 400. The current target speed, $v_O$, the planned initial speed, $V_I$ and planned intermediate speed, $V_M$, are decremented until the projected separation is determined to be acceptable.

Referring to FIG. 6B, the processing logic for the adjustment of the own-ship speed profile can be broken down into three sub-steps. Step 1 tests whether the predicted minimum separation value is adequate. Step 2 iteratively increases or decreases the speed change in order to calculate a potential new speed command that will bring the predicted minimum separation to an adequate level. The minimum separation is predicted iteratively based on the potential speed change in this step. Step 3 determines whether a new speed command and a NEW_COMMAND alert, i.e., an audible or visual warning to the cockpit crew, should be issued. If so, this step calculates the new speed command, revises the speed profile of own-ship 400 accordingly and issues the NEW_COMMAND alert.

If, as indicated by decision block 690, the predicted minimum separation, $\Delta R_{MIN}$ does not meet the separation standard $R_{SEP}$ and the potential speed command $v_O$ has not reached the minimum allowed speed $V_{MIN}$, then flow is transferred to block 695 where $v_O$ is decremented by one knot. Following the speed change, a predicted minimum separation is recalculated in analogous manner to that of blocks 650, 660, and 670 using the new value of $v_O$.

If the predicted minimum separation $\Delta R_{MIN}$, meets the separation standard $R_{SEP}$ or the potential speed command $v_O$ has reached the minimum allowed speed, $V_{MIN}$, flow is transferred to decision block 700 where it is determined if the range of own-ship 400, $R_O$, is beyond the intermediate deceleration point, $R_{ID}$, and if the speed in the initial speed region, $V_I$, of the speed profile is greater than the intermediate speed $V_M$. If so, flow is transferred to block 705, where the minimum value of the proposed new speed command $v_O$, is limited to the intermediate speed $V_M$. Then, as indicated at decision block 707, if the proposed new speed command $v_O$ is less than or equal to the previous value of the speed command minus five (5) knots or the proposed new speed command $v_O$ reaches the intermediate speed $V_M$ for the first time, then, as indicated at block 709, a NEW_COMMAND alert is issued which tells the pilot that he must change the target indicated air speed of own-ship 400 to the new speed command immediately. Furthermore, a speed command is issued and the value of the proposed new speed command $v_O$ is assigned to the initial speed $V_I$ of the speed profile of own-ship 400.

Subsequent to the method steps of block 709 or if the determination of decision block 707 is in the negative, flow is transferred to decision block 750, the details of which will be discussed in paragraphs that follow.

If the determination of decision block 700 is in the negative, flow is transferred to decision block 710 where it is ascertained if own-ship 400 is in the intermediate speed region or if own-ship 400 is beyond $R_{ID}$ and the speed in the initial speed region, $V_I$, of the speed profile is equal to the intermediate speed, $V_M$. If neither condition of decision block 710 is affirmed, flow is transferred to decision block 750 which will be discussed in paragraphs that follow. If either condition of decision block 710 is affirmed, flow is transferred to block 720 where the minimum proposed value of the new speed command $v_O$ is limited to the minimum allowed speed for the aircraft, $V_{MIN}$. Flow is then transferred to decision block 730 where it is ascertained if the proposed new speed command $v_O$ is less than or equal to the previous value of the speed command minus five (5) knots or the minimum allowed speed, $V_{MIN}$ has been reached for the first time. If neither condition of decision block 730 is affirmed, flow is transferred to decision block 750. Otherwise, flow is transferred to block 740 where a NEW_COMMAND alert is issued which indicates to the pilot that the target speed of own-ship 400 is to be changed to the new speed command immediately. Furthermore, a new speed command is issued and the value of the proposed new speed command $v_o$ is assigned to the initial speed, $V_I$, and the intermediate speed, $V_M$, of the speed profile of own-ship 400. Flow is then transferred to decision block 750, the details of which will be discussed in paragraphs below.

If own-ship 400 is flying at the maximum allowed speed, then the algorithm proceeds to block 760. Otherwise, a trial speed plan is evaluated by projecting the inter-aircraft separation or inter-arrival time and assuming an increased speed in own-ship's planned speed profile through the approach. In a preferred embodiment, speed plans for own-ship 400 are evaluated at one knot increments in the planned speeds. The incremented speeds do not affect the planned final approach speed, VREF, however. The incrementing process only potentially affects the current target speed $v_O$, the initial speed $V_I$ and the intermediate speeds $V_M$ in the planned deceleration profile for own-ship 400. The current target speed $v_O$ and the planned intermediate speed $V_M$ are incremented until the projected separation or inter-arrival time is determined to be acceptable. The acceptability criteria are that the speed increase is less than a parameter value, nominally ten (10) knots, or that the projected inter-arrival time is less than or equal to the desired inter-arrival time plus a time buffer parameter, nominally twenty (20) seconds. Each trial planned deceleration profile is evaluated by the forward time integration process described above.

If the speed revision process of FIG. 6B fails to make the predicted minimum separation between aircraft meet the separation standard, an attempt to make the minimum separation meet the separation standard is made by revising the location of $R_{FD}$ (or, commonly, FAF). Shifting own-ship's FAF away from the runway threshold equates to allowing own-ship 400 to decelerate to final speed sooner. Because the minimum separation distance ideally (but not always) happens at the same time the lead-ship arrives at the runway threshold, by decelerating to final speed sooner, own-ship may avoid violating the separation standard. This procedure is only used after the speed revision procedures of FIG. 6B have failed to make the minimum separation meet the separation standard.

The FAF location adjustment is accomplished by the loop formed from decision block 750 and block 755. While all of the following three conditions are true: the predicted minimum separation is less than the separation standard; the current speed command has reached the minimum allowed speed; the FAF is not out of the allowed range, move the FAF in the speed profile of own-ship 400 0.2 NM from the runway threshold 550 and recalculate the minimum separation $\Delta R_{MIN}$ based on the new speed profile of own-ship 400. The loop is continuously executed until either the predicted minimum separation between aircraft, $R_{O,L}$, is greater than the separation standard or the FAF is out of the allowed range. The allowed range of the FAF is based on heuristics and is usually airport dependent. Typically, the FAF is five (5) NM from the runway threshold 550. In a preferred embodiment of the present invention, the allowed range of the position of the FAF is between 5 NM and 6 NM from the runway threshold 550.

From block 750, flow is transferred to block 760 where the revised speed plan or profile is broadcast to other aircraft. In a preferred embodiment, the plan revisions are transmitted using ADS-B broadcast special "on-condition" messages. The revised plan is then used by the next aircraft in line behind own-ship 400 for its projections. In this way, a stream of aircraft are set-up for appropriate spacing. In the preferred embodiment, all aircraft in the final approach stream are required to use the same algorithm.

From block 760, flow is transferred to block 605 where the algorithm waits for the next cycle time. Once the next cycle time arrives, the algorithm restarts at block 610 and the process is repeated.

Figure 7:
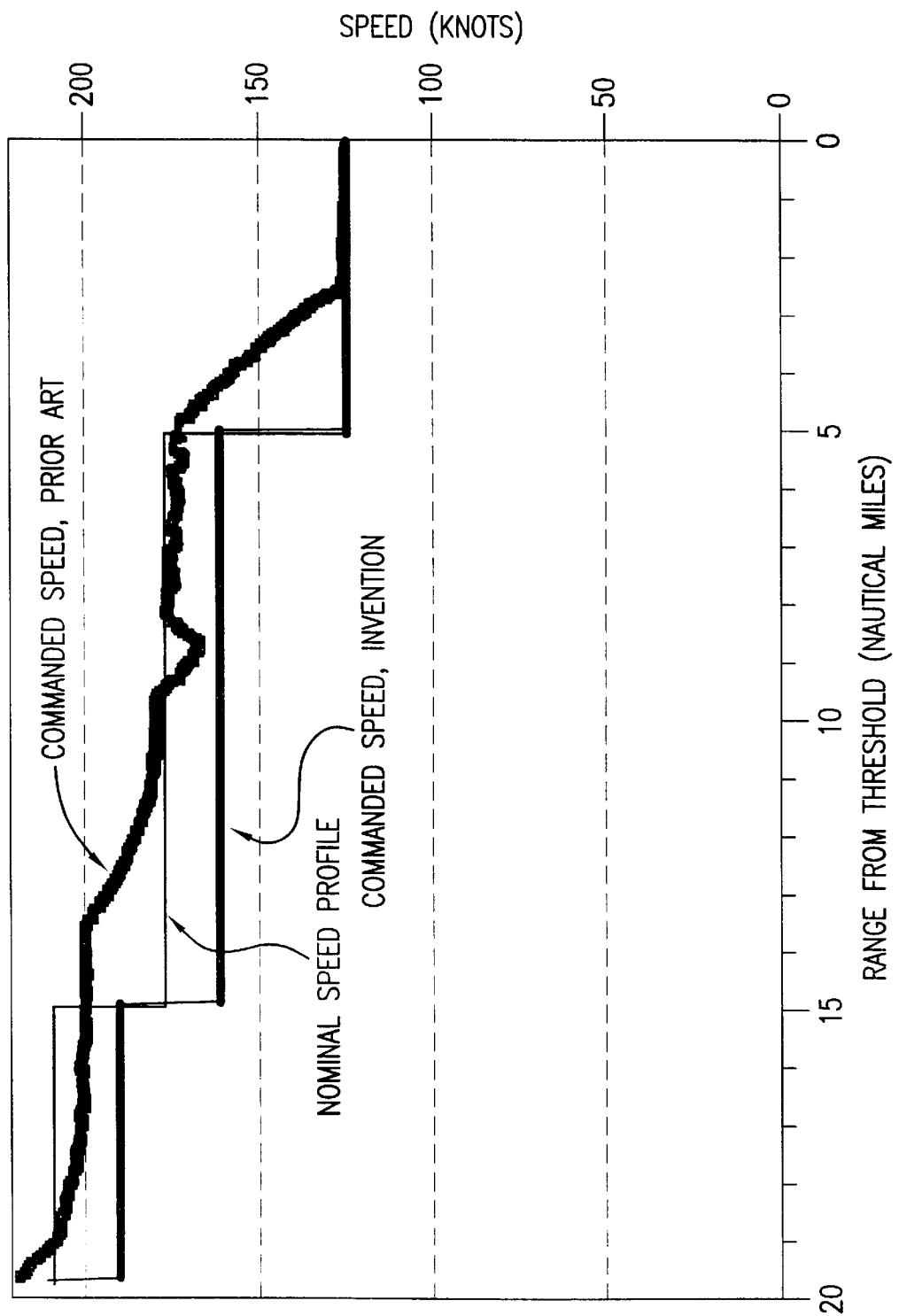

The operation and advantages of the present invention are observed in FIG. 7 and in Table 1. FIG. 7 illustrates the speed commands that are to be displayed to flight crews using the algorithm of the instant invention. The speed commands of the present invention are illustrated as the dark line labeled "commanded speed, invention". Speed commands issued by algorithms of the prior art are demonstrated by the line labeled "commanded speed, prior art". The nominal speed profile for the typical approach in this example is labeled "nominal speed profile".

One advantage of the instant invention is that the speed changes commanded are issued in discrete steps. As previously discussed, this will allow the flight crew to be more available to fly their approach, a workload intensive phase of flight, without constant monitoring of the commanded speed, as is required for prior art systems.

Not illustrated in FIG. 7 is the fact that the present invention allows a high speed of a trailing aircraft be maintained unless a problem is detected. In other words, the inventive algorithm allows own-ship 400 to fly at its current fast speed if the predicted minimum-separation is greater than the separation standard during IMC. The algorithm issues a new speed command (lower speed) only if the predicted minimum separation is less than the separation standard. This provides for a profile that is more fuel efficient than that of the prior art.

TABLE 1

Monte-Carlo Simulation Comparison of Invented Algorithm vs. Prior Art

| Measure | Invention | Prior Art |
| --- | --- | --- |
| Throughput | 32.9 | 32.8 |
| Total # of violations per 1000 flights | 0.8 | 3.8 |
| Total # of violations per 1000 flights with separation less than 18,000 ft. | 0.4 | 1.7 |

Table 1 shows a comparison of the results of a Monte-carlo simulation study of the present invention vs. that of prior art. In the present example, throughput for a single runway is compared in instrument conditions. Both the invention and prior art allow about 33 aircraft per hour to land at the modeled runway. The number of separation violations, however, are improved for the invention over that of the prior art. This will result in few missed approaches and is likely to result in a more acceptable operational implementation.

Although the invention has been described herein in conjunction with general and specific embodiments thereof, many alternatives, modifications, and variations will be apparent to those skilled in the art. The present invention is intended to embrace all such alternatives, modifications, and variations that fall within the spirit and broad scope of the appended Claims.

What is claimed is:

1. A method for conducting a moving vehicle along a trajectory of a coordinated maneuver being executed by the moving vehicle and at least one other moving vehicle, the method comprising the steps of:

providing the moving vehicle and the at least one other moving vehicle with a set of coordinated maneuver control parameters, said set of coordinated maneuver control parameters governing the coordinated maneuver; and at the moving vehicle:
(a) determining a vehicle state of the moving vehicle from at least one state indicating signal;
(b) calculating a projected maneuver for the moving vehicle from said vehicle state;
(c) receiving an other-vehicle data set from each of the at least one other moving vehicle, said other-vehicle data set including a vehicle state and a projected maneuver of the corresponding other moving vehicle, said other-vehicle data set being broadcast from said each of the at least one other moving vehicle;

(d) calculating a projected coordinated maneuver based upon said projected maneuver of the moving vehicle and said other vehicle data set from each of the at least one other vehicle, said projected coordinated maneuver being constrained by said coordinated maneuver control parameters;

(e) adjusting said projected maneuver of the moving vehicle so that a trajectory prescribed thereby is as prescribed by said projected coordinated maneuver;

(f) adjusting said vehicle state of the moving vehicle so as to conduct the moving vehicle along said trajectory prescribed by said projected maneuver;

(g) broadcasting a vehicle data set of the moving vehicle, said vehicle data set including said vehicle state and said projected maneuver of the moving vehicle;

(h) performing an exit procedure if the moving vehicle is to exit the coordinated maneuver; and (i) repeating the method at step (a) if the moving vehicle is to continue participation in the coordinated maneuver.

2. The method for conducting a moving vehicle along a trajectory of a coordinated maneuver as recited in claim 1, wherein said projected maneuver of the moving vehicle is broadcast in said vehicle data set in step (g) only if said projected maneuver of the moving vehicle was adjusted in step (e).

3. The method for conducting a moving vehicle along a trajectory of a coordinated maneuver as recited in claim 2, where the moving vehicle is to exit the coordinated maneuver in step (h) if the moving vehicle is in an exit condition.

4. The method for conducting a moving vehicle along a trajectory of a coordinated maneuver as recited in claim 3, where step (e) includes the step of decreasing or increasing a proposed new speed in said projected maneuver by a predetermined amount.

5. The method for conducting a moving vehicle along a trajectory of a coordinated maneuver as recited in claim 4, wherein said projected maneuver for the moving vehicle and said projected maneuver for said each of the at least one other vehicle include a plurality of deceleration points corresponding to predetermined ranges to a respective reference point in each of said projected maneuver for the moving vehicle and said projected maneuver for said each of the at least one other vehicle at which the corresponding one of the moving vehicle and said each of the at least one other vehicle is to decrease speed, said plurality of deceleration points separating the coordinated maneuver into regions of constant velocity.

6. The method for conducting a moving vehicle along a trajectory of a coordinated maneuver as recited in claim 5, wherein said respective reference point in each of said projected maneuver for the moving vehicle and said projected maneuver for said each of the at least one other vehicle are co-located at a single reference point.

7. The method for conducting a moving vehicle along a trajectory of a coordinated maneuver as recited in claim 6, where a planned speed in a first one of said regions of constant velocity in said projected maneuver of said each of the at least one other vehicle and said projected maneuver of the moving vehicle is an initial speed value, a planned speed in a second one of said regions of constant velocity in said projected maneuver of said each of the at least one other vehicle and said projected maneuver of the moving vehicle is an intermediate speed value, a planned speed in a third one of said regions of constant velocity in said projected maneuver of said each of the at least one other vehicle and said projected maneuver of the moving vehicle is a final speed value, wherein said first and second regions of constant velocity are separated by an intermediate deceleration point and said second and third regions of constant velocity are separated by a final deceleration point in said projected maneuver of the corresponding aircraft.

8. The method for conducting a moving vehicle along a trajectory of a coordinated maneuver as recited in claim 7, where said projected maneuver of said each of the at least one other vehicle and said projected maneuver of the moving vehicle are calculated by forward integration of Newtonian motion equations over time from a current time to at least one future time for a corresponding one of said each of the at least one other vehicle and the moving vehicle.

9. The method for conducting a moving vehicle along a trajectory of a coordinated maneuver as recited in claim 8, where said projected maneuver for said each of the at least one other vehicle is calculated by said forward integration in which said at least one future time is a time at which a respective one of said each of the at least one other vehicle is projected by said forward integration to arrive at said single reference point.

10. The method for conducting a moving vehicle along a trajectory of a coordinated maneuver as recited in claim 9, where said projected maneuver for the moving vehicle is calculated by said forward integration in which first ones of said at least one future time is said time each of said respective one of the at least one other vehicle is projected to arrive at said single reference point and a second one of said at least one future time is a time the moving vehicle is projected by said forward integration to arrive at said single reference point.

11. The method for conducting a moving vehicle along a trajectory of a coordinated maneuver as recited in claim 10, further comprising the step of adjusting a location of a deceleration point if step (e) fails to indicate that the moving vehicle is projected to arrive at said single reference point in compliance with said coordinated maneuver control parameters.

12. The method for conducting a moving vehicle along a trajectory of a coordinated maneuver as recited in claim 11, where said adjusted deceleration point is said final deceleration point.

13. The method for conducting a moving vehicle along a trajectory of a coordinated maneuver as recited in claim 12, where the moving vehicle and the at least one other vehicle are aircraft.

14. The method for conducting a moving vehicle along a trajectory of a coordinated maneuver as recited in claim 13, where the coordinated maneuver is a final approach maneuver to a runway of an airport, wherein a trajectory of one of the at least one other vehicles is aligned with both said runway and said trajectory of the moving vehicle and said one of the at least one other vehicle is spatially interposed between said runway and the moving vehicle, said one of the at least one other vehicle being designated as a lead vehicle and where said single reference point is a runway threshold terminating one end of said runway.

15. The method for conducting a moving vehicle along a trajectory of a coordinated maneuver as recited in claim 14, where said coordinated maneuver control parameters includes a minimum inter-arrival time at said runway threshold between successively arriving aircraft.

16. The method for conducting a moving vehicle along a trajectory of a coordinated maneuver as recited in claim 15, where said coordinated maneuver control parameters includes a minimum spacing between adjacent aircraft throughout the final approach maneuver.

17. The method for conducting a moving vehicle along a trajectory of a coordinated maneuver as recited in claim 16, where said lead vehicle data set and said moving vehicle data set are broadcast in accordance with Automatic Dependent Surveillance Broadcast (ADS-B) standards.

18. The method for conducting a moving vehicle along a trajectory of a coordinated maneuver as recited in claim 1, where one of said at least one state indicating signal is received from a global positioning satellite system.

19. The method for conducting a moving vehicle along a trajectory of a coordinated maneuver as recited in claim 1, where one of said at least one state indicating signal is received from airport instrumentation.

20. The method for conducting a moving vehicle along a trajectory of a coordinated maneuver as recited in claim 1, where one of said at least one state indicating signal is received from aircraft instrumentation.

21. A method for conducting an aircraft along a trajectory of a coordinated maneuver being executed by the aircraft and at least one other aircraft, the method comprising the steps of:

providing the aircraft and the at least one other aircraft with a set of coordinated maneuver control parameters, said set of coordinated maneuver control parameters governing the coordinated maneuver; and at the aircraft:

(j) determining a state of the aircraft from at least one state indicating signal;

(k) calculating a projected maneuver for the aircraft from at least said state of the aircraft;

(l) receiving an other-aircraft data set from each of the at least one other aircraft, said other-aircraft data set including a vehicle state and a projected maneuver of the corresponding other aircraft, said other-aircraft data set being broadcast from said each of the at least one other aircraft;

(m) calculating a projected coordinated maneuver based upon said other-aircraft data set from each of the at least one other aircraft, said projected coordinated maneuver being constrained by said coordinated maneuver control parameters;

(n) adjusting said projected maneuver for the aircraft as necessary so that a trajectory prescribed thereby is as prescribed by said projected coordinated maneuver;

(o) adjusting said state of the aircraft so as to conduct the aircraft along said trajectory prescribed by said projected coordinated maneuver;

(p) broadcasting a data set of the aircraft including at least one of said state and said projected maneuver of the aircraft, said projected maneuver of the aircraft being included in said data set of the aircraft if said projected maneuver was adjusted in step (n);

(q) performing an exit procedure if the aircraft is in an exit condition; and (r) repeating the method at step (j) if the aircraft is to continue participation in the coordinated maneuver.

22. The method for conducting an aircraft along a trajectory of a coordinated maneuver as recited in claim 21, where step (n) includes the step of decreasing or increasing a proposed new speed in said projected maneuver by a predetermined amount.

23. The method for conducting an aircraft along a trajectory of a coordinated maneuver as recited in claim 22, wherein said projected maneuver for the aircraft and said projected maneuver for each of the at least one other aircraft include a plurality of deceleration points corresponding to predetermined ranges to a reference point at which the corresponding one of the aircraft or said each of the at least one other aircraft is to decrease speed, said plurality of deceleration points separating said coordinated maneuver into regions of constant velocity.

24. The method for conducting an aircraft along a trajectory of a coordinated maneuver as recited in claim 23, where a planned speed in a first one of said regions of constant velocity in said projected maneuver of said each of the at least one other aircraft and said projected maneuver of the aircraft is an initial speed value, a planned speed in a second one of said regions of constant velocity in said projected maneuver of said each of the at least one other aircraft and said projected maneuver of the aircraft is an intermediate speed value, a planned speed in a third one of said regions of constant velocity in said projected maneuver of said each of the at least one other aircraft and said projected maneuver of the aircraft is a final speed value, wherein said first and second regions of constant velocity are separated by an intermediate deceleration point and said second and third regions of constant velocity are separated by a final deceleration point in said projected maneuver of the corresponding aircraft.

25. The method for conducting an aircraft along a trajectory of a coordinated maneuver as recited in claim 24, where said projected maneuver of said each of the at least one other aircraft and said projected maneuver of the aircraft are calculated by forward integration of Newtonian motion equations over time from a current time to at least one future time for a corresponding one of said each of the at least one other aircraft and the aircraft.

26. The method for conducting an aircraft along a trajectory of a coordinated maneuver as recited in claim 25, where said projected maneuver for said each of the at least one other aircraft is calculated by said forward integration in which said at least one future time is a time at which a respective one of the at least one other aircraft is projected by said forward integration to arrive at said reference point.

27. The method for conducting an aircraft along a trajectory of a coordinated maneuver as recited in claim 26, where said projected maneuver for the aircraft is calculated by said forward integration in which first ones of said at least one future time is said time each of said corresponding one of the at least one other aircraft is projected to arrive at said reference point and a second one of said at least one future time is a time the aircraft is projected by said forward integration to arrive at said reference point.

28. The method for conducting an aircraft along a trajectory of a coordinated maneuver as recited in claim 27, further comprising the step of adjusting a location of a deceleration point if step (n) fails to indicate that the aircraft is projected to arrive at said reference point in compliance with said coordinated maneuver control parameters.

29. The method for conducting an aircraft along a trajectory of a coordinated maneuver as recited in claim 28, where said adjusted deceleration point is said final deceleration point.

30. The method for conducting an aircraft along a trajectory of a coordinated maneuver as recited in claim 29, where the coordinated maneuver is a final approach maneuver to a runway of an airport, wherein a trajectory of one of the at least one other aircraft is aligned with both said runway and said trajectory of the aircraft and said one of the at least one other aircraft is spatially interposed between said runway and the aircraft, said one of the at least one other aircraft being designated as a lead aircraft and where said reference point is a runway threshold terminating one end of said runway.

31. The method for conducting an aircraft along a trajectory of a coordinated maneuver as recited in claim 30, where said coordinated maneuver control parameters includes a minimum inter-arrival time at said runway threshold between successively arriving aircraft.

32. The method for conducting an aircraft along a trajectory of a coordinated maneuver as recited in claim 30, where said coordinated maneuver control parameters includes a minimum spacing between adjacent aircraft throughout the final approach maneuver.

33. The method for conducting an aircraft along a trajectory of a coordinated maneuver as recited in claim 21, where said other-aircraft data set and said data set of the aircraft are broadcast in accordance with Automatic Dependent Surveillance Broadcast (ADS-B) standards.

34. The method for conducting an aircraft along a trajectory of a coordinated maneuver as recited in claim 21, where one of said at least one state indicating signal is received from a global positioning satellite system.

35. The method for conducting an aircraft along a trajectory of a coordinated maneuver as recited in claim 21, where one of said at least one state indicating signal is received from airport instrumentation.

36. The method for conducting an aircraft along a trajectory of a coordinated maneuver as recited in claim 21, where one of said at least one state indicating signal is received from aircraft instrumentation.

37. A method for conducting an aircraft through a final approach maneuver at a runway of an airport, the aircraft being designated an own-ship and trailing in runway approach order another aircraft designated as a lead-ship, the own-ship and the lead-ship being aligned with the runway so as to land at a region beyond a terminating runway threshold, the method comprising the steps of:

(s) initializing an own-ship planned speed profile based upon an own-ship state;

(t) evaluating either of an exit condition or an emergency condition and performing an exit procedure or an emergency exit procedure, respectively, in response thereto;

(u) receiving a lead-ship information set including a lead-ship state and a projected lead-ship range-to-threshold function operating on units of time as an independent variable;

(v) calculating a projected own-ship range-to-threshold function operating on units of time as an independent variable;

(w) adjusting said own-ship state so that a revised own-ship speed profile based thereon indicates that the own-ship is projected to cross the runway threshold within constraints set by at least one control parameter;

(x) setting said own-ship planned speed profile to said revised own-ship speed profile;

(y) broadcasting an own-ship information set, said own-ship information set including said own-ship state and said projected own-ship range-to-threshold function, said projected own-ship range-to-threshold function being broadcast only if said revised own-ship speed profile differed from said own-ship planned speed profile prior to setting said own-ship planned speed profile to said revised own-ship speed profile in step (x); and (z) repeating the method at step (t).

38. The method for conducting an aircraft through a final approach maneuver at a runway of an airport as recited in claim 37, where said lead-ship state and said own-ship state include current latitude, current longitude, current aircraft heading, current indicated airspeed and current altitude of the corresponding aircraft.

39. The method for conducting an aircraft through a final approach maneuver at a runway of an airport as recited in claim 38, where said projected lead-ship range-to-threshold function is determined from at least a lead-ship planned speed profile and said projected own-ship range-to-threshold function is determined from at least said own-ship planned speed profile.

40. The method for conducting an aircraft through a final approach maneuver at a runway of an airport as recited in claim 39, where said own-ship planned speed profile and said lead-ship planned speed profile include a plurality of deceleration points corresponding to predetermined ranges to the runway threshold at which the corresponding one of the own-ship or the lead-ship is to decrease speed, said plurality of deceleration points separating the final approach maneuver into regions of constant velocity.

41. The method for conducting an aircraft through a final approach maneuver at a runway of an airport as recited in claim 40, where a planned speed in a first one of said regions of constant velocity in said lead-ship planned speed profile and said own-ship planned speed profile is an initial speed value, a planned speed in a second one of said regions of constant velocity in said lead-ship planned speed profile and said own-ship planned speed profile is an intermediate speed value, a planned speed in a third one of said regions of constant velocity in said lead-ship planned speed profile and said own-ship planned speed profile is a final speed value, wherein said first and second regions of constant velocity are separated by an intermediate deceleration point and said second and third regions of constant velocity are separated a final deceleration point in the planned speed profile of the corresponding aircraft.

42. The method for conducting an aircraft through a final approach maneuver at a runway of an airport as recited in claim 41, where said lead-ship range-to-threshold function and said own-ship range-to-threshold function are calculated by forward integration of Newtonian motion equations over time from a current time to at least one future time for a corresponding one of the lead-ship and the own-ship.

43. The method for conducting an aircraft through a final approach maneuver at a runway of an airport as recited in claim 42, where said lead-ship range-to-threshold function is calculated by said forward integration, wherein said at least one future time is a time at which the lead-ship is projected by said forward integration to cross the runway threshold.

44. The method for conducting an aircraft through a final approach maneuver at a runway of an airport as recited in claim 43, where said own-ship range-to-threshold function is calculated by said forward integration, wherein a first one of said at least one future time is said time the lead-ship is projected to cross the runway threshold and a second one of said at least one future time is a time the own-ship is projected by said forward integration to cross the runway threshold.

45. The method for conducting an aircraft through a final approach maneuver at a runway of an airport as recited in claim 37, where step (w) includes the step of decreasing or increasing a proposed new speed in said revised own-ship speed profile by a predetermined amount.

46. The method for conducting an aircraft through a final approach maneuver at a runway of an airport as recited in claim 45, further comprising the step of adjusting a location of a deceleration point if step (w) fails to indicate that the own-ship is projected to cross the runway threshold in accordance with said at least one control parameter.

47. The method for conducting an aircraft through a final approach maneuver at a runway of an airport as recited in claim 46, where said adjusted deceleration point is said final deceleration point.

48. The method for conducting an aircraft through a final approach maneuver at a runway of an airport as recited in claim 47, where said control parameter is a minimum inter-arrival time at the runway threshold between successively arriving aircraft.

49. The method for conducting an aircraft through a final approach maneuver at a runway of an airport as recited in claim 47, where said control parameter is a minimum spacing between adjacent aircraft throughout the final approach maneuver.

50. The method for conducting an aircraft through a final approach maneuver at a runway of an airport as recited in claim 37, where said lead-ship information set and said own-ship information set are broadcast in accordance with Automatic Dependent Surveillance Broadcast (ADS-B) standards.

51. The method for conducting an aircraft through a final approach maneuver at a runway of an airport as recited in claim 37, where said lead-ship state and said own-ship state are determined from information received from a global positioning satellite system.

52. The method for conducting an aircraft through a final approach maneuver at a runway of an airport as recited in claim 37, where said lead-ship state and said own-ship state are determined from information received from airport instrumentation.

53. The method for conducting an aircraft through a final approach maneuver at a runway of an airport as recited in claim 37, where said lead-ship state and said own-ship state are determined from information received from aircraft instrumentation.

* * * * *